June 24, 1930.   P. B. MILLS ET AL   1,766,184
COMPUTING METER
Filed Nov. 11, 1927
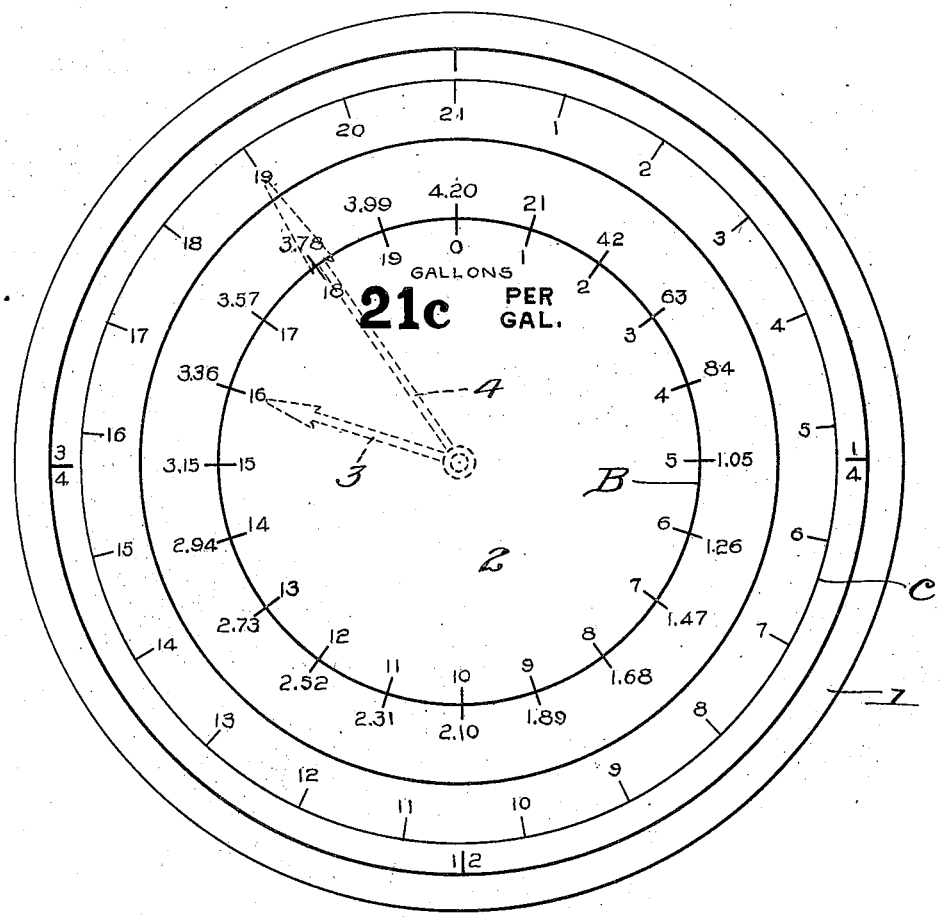
Inventors
Perley B. Mills
Elby R. Mills
By
Attorney Patented June 24, 1930

1,766,184

UNITED STATES PATENT OFFICE

PERLEY B. MILLS AND ELBY R. MILLS, OF SABINA, OHIO

COMPUTING METER

Application filed November 11, 1927. Serial No. 232,688.

This invention relates to an improved price computing index especially adapted for use in connection with motor fuel dispensing pumps for the purpose of aiding the pump attendant to ascertain with accuracy and convenience the cost and sales price of any given quantity of liquid passed thru the pumps.

It is an outstanding object of the invention to provide a computing index of this character by which the price per gallon of fuel dispensed is indicated and in addition the price for each fraction of a gallon dispensed, the formation of the index being such that the quantity and price of the fuel discharged from the pump may be determined at a glance, and without requiring the attendant to resort to a mathematical process.

For further understanding of the invention reference is to be had to the following description of the accompanying drawing, wherein;

Figure 1 designates a front elevation of the improved computing index comprising the present invention.

Referring more particularly to the drawing, the numeral 1 designates the computing index in the entirety.

The index 1, usually formed by means of a card-like body 2, is adapted to be mounted upon the ordinary type of a motor fuel dispensing pump (not shown). These pumps are provided ordinarily with a pair of index hands 3 and 4, the shorter of which being provided to indicate gallons and multiples thereof while the longer hand is employed to indicate fractions of a gallon. These hands are actuated in such a manner by the operation of the pumps that the longer hand 4 will make a complete revolution while the shorter hand 3 moves a distance corresponding to one gallon.

In accordance with the present invention the index 1 includes an inner scale B which is cooperative with the shorter hand 3. The scale B is provided with equally spaced divisions or graduations indicating successive gallons, such as from 1 to 20, and opposite these divisions or graduations, there is placed a circularly arranged row of figures indicating the sales price for each gallon of fuel dispensed. This sales price is computed from a basic or determined price per gallon, and the figures indicating the sales price, opposite to the gallon figures of the scale B, are, of course, multiples of said determined price as indicated by the successively increasing gallons.

For example, if the basic or determined price should be 21¢ per gallon, 9 gallons of fuel as indicated by scale B will equal $1.89 and 17 gallons will be $3.57, corresponding multiples are provided after the remaining divisions of the scale. It will be appreciated, of course, that the basic or determined price may vary, and the index may be printed so as to be based on any designated determined price. In this respect a fractional price such as 21.5¢ per gallon may be used and the index may be used with right results.

An outstanding feature of the present invention resides in the provision of the outer scale C which is graduated to indicate fractions of a gallon, and in addition to these fractional divisions, the scale C is further divided into graduations consisting of units of the basic or determined price; for example, if the basic price is 21¢, the outer scale C is divided into 21 parts which is suitably marked by progressive numbers from 1 to 21. If the sales price happens to be 22¢ the outside scale will be divided into 22 parts as will be apparent. The outer scale cooperates with the longer hand 4 and is useful in determining the cost of the fractional part of a gallon of liquid dispensed.

It is customary in most filling stations to fill completely the fuel tanks of automobiles. It often happens that the tank is filled when a fractional portion of a gallon has been reached and it becomes necessary to shut off the flow of the liquid before the full gallon can be registered. To determine accurately the cost of this fractional portion of the gallon, the attendant merely refers to the outer scale which may indicate 15. Assuming that the scale B indicates that 10 gallons of fuel have been poured into the tank, the attendant will then know by referring to the scale B that the sales price for the total amount of fuel will be $2.25, the shorter hand pointing to $2.10 on the scale B and the longer hand to 15¢ on the scale C, simple arithmetic indicating the total cost as $2.25. If 16 gallons have been pumped with a basic price of 21¢ the total cost as indicated by the scale B will be $3.36. If, however, an additional amount over 16 gallons but not 17 gallons has been dispensed the attendant refers to the scale C to determine the cost on this fractional portion of the scale. If it happens to be 18¢ the total cost will be $3.54.

In view of the foregoing it will be seen that the present invention provides a simple and easily read computing index particularly adapted for use in connection with motor fuel dispensing pumps, however, we do not limit ourselves to the use of the index to this capacity alone, but reserve the right to apply the same in connection with indicators generally and upon any apparatus in connection with which the index may be useful.

What is claimed is:

A computing index adapted for attachment to indicating mechanisms of the type having an index surface and a pair of revolving index hands, one of which hands revolves through an arc of a circle to indicate one unit of measurement while the other hand revolves through a complete circle, said computing index comprising a circular index surface, said index surface including an inner and outer scale, said inner scale being adapted for cooperation with the first mentioned of said hands and provided with equally spaced graduations indicating a number of progressively increasing units of measure, price data cooperative with the graduations of said inner scale and constituting multiples of a determined price per unit of measure, the said outer scale being adapted for cooperation with the second named hand and provided with equally spaced graduations in number corresponding to the number of price units contained in the determined price per unit of measurement, and numerals arranged in sequence and opposite each of said graduations.

In testimony whereof we affix our signatures.

PERLEY B. MILLS.
ELBY R. MILLS.